United States Patent
Adamic et al.

(10) Patent No.: US 9,822,270 B2
(45) Date of Patent: Nov. 21, 2017

(54) BINARY INK SETS

(71) Applicant: Hewlett-Packard Development Company, L.P., Fort Collins, CO (US)

(72) Inventors: Raymond Adamic, Corvallis, OR (US); Vladek Kasperchik, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/118,403

(22) PCT Filed: Mar. 6, 2014

(86) PCT No.: PCT/US2014/021277
§ 371 (c)(1),
(2) Date: Aug. 11, 2016

(87) PCT Pub. No.: WO2015/134027
PCT Pub. Date: Sep. 11, 2015

(65) Prior Publication Data
US 2017/0174917 A1     Jun. 22, 2017

(51) Int. Cl.
*C09D 11/36* (2014.01)
*B41J 2/21* (2006.01)
(Continued)

(52) U.S. Cl.
CPC .......... *C09D 11/36* (2013.01); *B41J 2/21* (2013.01); *C09D 11/033* (2013.01); *C09D 11/324* (2013.01); *C09D 11/38* (2013.01)

(58) Field of Classification Search
CPC ........ C09D 11/101; C09D 11/30; C09D 11/34
See application file for complete search history.

(56) References Cited

U.S. PATENT DOCUMENTS 8,262,210 B2   9/2012   Chretien et al.
8,263,683 B2   9/2012   Gibson et al.
(Continued)

FOREIGN PATENT DOCUMENTS

JP        2000256590        9/2000

OTHER PUBLICATIONS

International Search Report dated Dec. 5, 2014 for PCT/US2014/021277, Applicant Hewlett-Packard Development Company, L.P.

*Primary Examiner* — Stephen Meier
*Assistant Examiner* — John P Zimmermann
(74) *Attorney, Agent, or Firm* — Thorpe, North & Western L.L.P.

(57) ABSTRACT

The present disclosure provides binary ink sets and related methods. In one example, a binary ink set for printing a non-Newtonian inkjet image can comprise a gelator inkjet ink comprising a gelator in an amount ranging from 0.1% to 10% by weight based on the total weight of the gelator ink and an organic solvent; and a colorant inkjet ink comprising a colorant and an organic solvent. The gelator inkjet ink and the colorant inkjet ink can be configured to form a structured network upon printing where the non-Newtonian inkjet ink has a first dynamic viscosity ranging from 25 cps to 10,000 cps at a first state and a second dynamic viscosity ranging from 1 cps to 50 cps at a second state, measured at 25° C.

16 Claims, 2 Drawing Sheets

(51) Int. Cl.
*C09D 11/324* (2014.01)
*C09D 11/033* (2014.01)
*C09D 11/38* (2014.01)

(56) References Cited

U.S. PATENT DOCUMENTS

| | | |
|---|---|---|
| 8,496,326 B2 | 7/2013 | Hook et al. |
| 2004/0065227 A1 | 4/2004 | Breton et al. |
| 2006/0122291 A1 | 6/2006 | Goredema et al. |
| 2006/0159850 A1 | 7/2006 | Breton et al. |
| 2007/0211110 A1 | 9/2007 | Iftime et al. |
| 2007/0254978 A1 | 11/2007 | Odell et al. |
| 2008/0039549 A1 | 2/2008 | Li et al. |
| 2010/0055423 A1 | 3/2010 | Chretien et al. |
| 2011/0169887 A1* | 7/2011 | Kabalnov ............ C09D 11/322 347/20 |
| 2012/0032108 A1* | 2/2012 | Stockum ................ C03C 15/00 252/79.3 |
| 2016/0355696 A1* | 12/2016 | Adamic ................ C09D 11/322 |
| 2016/0362573 A1* | 12/2016 | Adamic ................ C09D 11/322 |
| 2017/0051172 A1* | 2/2017 | Adamic ................ C09D 11/38 |

* cited by examiner

BINARY INK SETS

BACKGROUND

The use of ink-jet printing systems has grown dramatically in recent years. This growth may be attributed to substantial improvements in print resolution and overall print quality. Today's ink-jet printers offer acceptable print quality for many commercial, business, and household applications at costs significantly lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium. Inks normally used in ink-jet recording are commonly composed of water-soluble organic solvents (humectants, etc.), surfactants, and colorants in a predominantly aqueous fluid. When a recording is made on "plain paper," the deposited colorants retain some mobility, which can be manifest in poor bleed, edge acuity, feathering, and inferior optical density/chroma (due to penetration on the paper). These features adversely impact text and image quality. Other systems include using a coated paper or coating the paper immediately before printing with the inkjet ink. Such coatings generally contain various components such as fixers to reduce colorant mobility. However, such systems can be costly, can lower print quality, and can be limiting as the media is typically matched to the inks.

BRIEF DESCRIPTION OF THE DRAWINGS

Additional features and advantages of the disclosure will be apparent from the detailed description which follows, taken in conjunction with the accompanying drawings, which together illustrate, by way of example, features of the technology; and, wherein.

Figure 1:
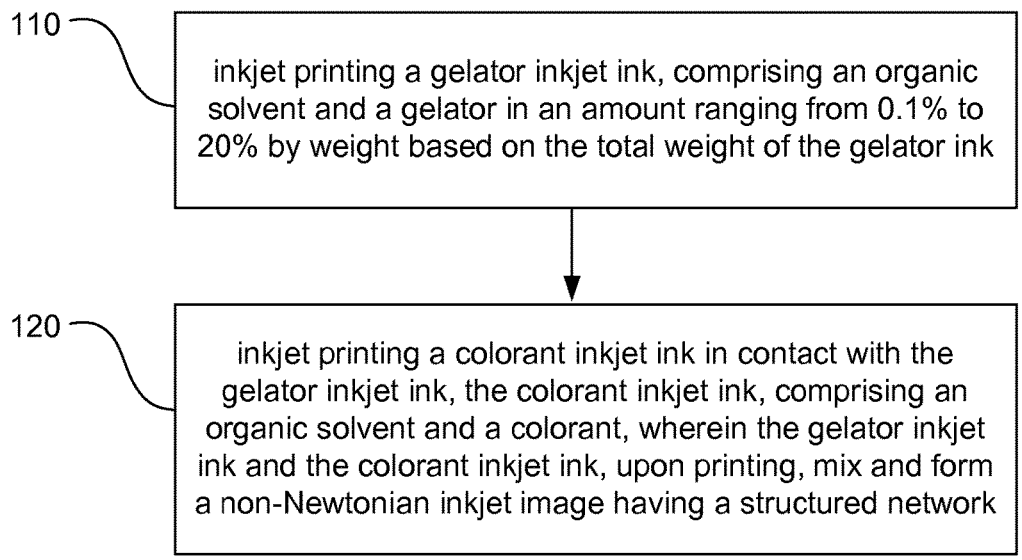
FIG. 1 is a flow chart of a method in accordance with an example of the present disclosure.

Reference will now be made to the exemplary embodiments illustrated, and specific language will be used herein to describe the same. It will nevertheless be understood that no limitation of the scope of the disclosure is thereby intended.

DETAILED DESCRIPTION

It has been recognized that non-Newtonian inkjet inks can be prepared from a binary system of inks which allow for printing of the inks via inkjet technologies in a non-viscous state while achieving increased viscosity after printing. Notably, the formation of a structured network after printing can allow for the present binary ink set to provide more degrees of freedom with regards to the formulations and resultant paper attributes, such as better optical density than achieved by traditional Newtonian inkjet inks.

Examples in accordance with the technology described herein are directed to binary ink sets that form a non-Newtonian inkjet ink that are useful in standard inkjet printing systems. The present binary ink sets include multiple inks (at least two), each of which can be inkjet printed at a viscosity suitable for inkjet printing technologies, e.g. 1 to 20 cps. Such inks also have the advantage of being able to be formulated with common inkjet ink vehicle components, e.g., dispersants, surfactants, viscosity modifiers, etc., without interfering with the resultant structured network. Generally, the structured network is assembled upon printing by mixing a gelator in one of the binary inks with a dissolved salt in the other binary ink. Alternatively, other triggering mechanisms can be used, such as pH, heat, salt and ionic strength, etc. Alternatively, one of the binary inks can contain both the gelator and the salt, but does not self-assemble until mixing with the other binary ink, where such ink has been modified to act as a gel reaction trigger, e.g., having a pH that triggers the gelator and salt of the first binary ink to self-assemble into a structured network. Alternatively, there may be occasions where there is a gelator in both fluids, such as a metal oxide on one ink and a low molecular weight organic gelator in the other ink (one of which may include the colorant), and the structured network is formed and triggered by pH, for example. To illustrate, the metal oxide may reside as a fluid at about pH 5 or 6 and the low molecular weight organic gelator as a fluid at about pH 9 or 10. Each fluid thus is dependent on the other to maximize the structure formation of interest. Other combinations and triggering mechanisms can alternatively be used as would be appreciated by one skilled in the art after considering the present disclosure.

It is noted that when discussing the present compositions and methods, each of these discussions can be considered applicable to each of these embodiments, whether or not they are explicitly discussed in the context of that embodiment. Thus, for example, in discussing a low molecular weight organic gelator used in a binary ink set, such a low molecular weight organic gelator can also be used in a method of printing a binary ink set to form a non-Newtonian inkjet image, and vice versa.

It is also noted that when referring to an "ink" or an "inkjet ink," this does not infer that a colorant necessarily be present. Inks, as defined herein, can be colorant free or can alternatively include colorant.

Generally, recording media and/or inkjet inks can have a variety of additives and coatings to provide acceptable quality when used in printing applications. However, utilizing the present binary ink set can eliminate the use of some layers, can eliminate costly additives, and/or can eliminate the amounts of materials needed in the media sheets or inks.

With the above in mind, a binary ink set for printing a non-Newtonian inkjet ink can comprise a gelator inkjet ink and a colorant inkjet ink. The gelator ink generally comprises a gelator in an amount ranging from 0.1% to 20% by weight based on the total weight of the final ink; and an organic solvent. The colorant inkjet ink generally comprises a colorant; and an organic solvent. Typically, the gelator inkjet ink and the colorant inkjet ink are configured to form a structured network upon printing, where the non-Newtonian inkjet ink has a first dynamic viscosity ranging from 25 cps to 10,000 cps at a first state and a second dynamic viscosity ranging from 1 cps to 50 cps at a second state. The first dynamic viscosity is generally higher than the second dynamic viscosity.

Regarding the present states, such states generally refer to the non-Newtonian inkjet ink at a first state, e.g. proximate in time to when at rest (subject to shear rate of 5 s$^{-1}$) or at room temperature (23° C.), and at a second state, e.g. proximate in time to when at high shear (10,000 s$^{-1}$) or at elevated temperature (50° C.). In one example, the viscosity of the first state can be higher than 10,000 cps, such as at least 20,000 cps, at least 100,000 cps, or even at least 500,000 cps. Notably, the combination of shearing and heating can alter, e.g., lower, the viscosity profiles of the present inks.

As used herein, "structured network" refers to the three dimensional structure formed by a gelator, e.g., a low molecular weight organic gelator or a metal oxide, and a salt via electrostatic interactions and/or physical interactions after mixing of the binary inks, wherein the three dimensional structure is dependent upon mechanical and/or thermal forces. In one example, the structured network can be free of polymers in that the three dimensional structure does not comprise polymers. However, such an example does not preclude polymers to be present within the non-Newtonian inkjet ink, or even trapped or contained within the structured network. For example, the present binary ink sets can form a non-Newtonian inkjet ink that contains a polymeric surfactant that does not self-assemble as part of the three dimensional structure but can be present within such a structure.

Regarding the present description as it relates to "non-Newtonian," non-Newtonian fluid is one in which viscosity changes with changes related to an applied force, e.g. thermal or shear energy, resulting in a viscosity which may not be well-defined. An aspect of these non-Newtonian inks may not be intuitive to many observers is that dispersed pigments, even large and dense pigments, show little or no settling.

In one example, the structured network can comprise a low molecular weight organic gelator. As used herein, "low molecular weight organic gelator" refers to an organic molecule or oligomer that is able to form a three dimensional structure with a salt in the presence of an organic solvent and/or water to form a structured network. As used herein "oligomer" refers to a compound comprised of no more than 10 monomer units. Regarding low molecular weight, in one example, the present low molecular weight organic gelators can have a weight average molecular weight of 50 to 10,000 Mw. For oligomers, the present molecular weights refer to weight average molecular weights. In one aspect, the weight average molecular weight can be from 100 to 2,000 Mw. With respect to the use of low molecular weight organic gelators, without intending to be bound by any particular theory, it is believed that the gel structure can form by pi-pi stacking of aromatic groups and hydrogen bonding, thus forming cylindrical fibers. The salt can shield the repulsive electrostatic charge between the low molecular weight organic gelator species and allow them to interact. The salts can also act to strengthen the fibers or structured network primarily on the recording media.

The present low molecular weight organic gelators can include amino acids. Such amino acids can include peptides and cyclic peptides. In one example, the amino acids can have a protecting group, e.g., an amine protecting group. In one example, the amino acid can be an aliphatic amino acid such as glycine, alanine, valine, leucine, or isoleucine. In another example, the amino acid can be a hydroxyl or sulfur/selenium-containing amino acid such as serine, cysteine, selenocysteine, threonine, or methionine. In still another example, the amino acid can be a cyclic amino acid such as proline or a cyclic peptide. In yet another example, the amino acid can be an aromatic amino acid such as phenylalanine, tyrosine, or tryptophan. In still another example, the amino acid can be a basic amino acid such as histidine, lysine, or arginine. In still yet another example, the amino acid can be an acidic amino acid or amide-containing amino acid such as aspartate, glutamate, asparagine, or glutamine. Such amino acids can be individually functionalized with the presently disclosed protecting groups or can be combined into peptides, including cyclic peptides, with such functionalization. Regarding the amine protecting groups, in one example, the amine protecting group can be a fluorenyl methoxy carbonyl group. In another example, the amine protecting group can be an aromatic protecting group. Other derivatives can include naphthalene or naphthyl based peptides. In one specific example, the low molecular weight organic gelator can be N-(9-fluorenylmethoxycarbonyl)-L-phenylalanine. In another example, the low molecular weight organic gelator can be a dipeptide of N-(9-fluorenylmethoxycarbonyl)-L-phenylalanine. Other examples include naphthalene derivatives of N-(9-fluorenylmethoxycarbonyl)-L-phenylalanine. Such materials can be obtained from BaChem Chemicals Co.

As discussed herein, the low molecular weight organic gelator can generally be present in one of the inks of the binary ink set, e.g., in the gelator ink, in an amount ranging from 0.1% to 20% by weight based on the total weight of the gelator ink. In one example, the low molecular weight organic gelator can be present in an amount of 1% to 10% by weight, and in one aspect, 1% to 4% by weight; based on the total weight of the gelator ink.

In another example, the structured network can comprise a metal oxide. As used herein, "metal oxide" refers to a molecule comprising at least one metal or semi-metal (e.g. Si) atom and at least one oxygen atom which in a particulate form is able to form a three dimensional structure in the presence of salt dissolved in an organic solvent and/or water, thereby forming a structured network. As used herein "semi-metal" includes boron, silicon, germanium, arsenic, antimony, and tellurium, for example. In one example, the metal oxide can include with limitation aluminum oxide, silicon dioxide, zinc oxide, iron oxide, titanium dioxide, indium oxide, zirconium oxide, or mixtures thereof. As discussed herein, the metal oxide (again which is defined to include both metal and semi-metal oxides) can generally be present in the non-Newtonian inkjet ink in an amount ranging from 0.1% to 10% by weight based on the total weight of the ink. In one example, the metal oxide can be present in an amount at from 1% to 5% by weight, and in one aspect, at from 0.5% to 2% by weight, based on the total weight of the ink. Additionally, the particle size of the metal oxide can be varied depending on the desired properties of the non-Newtonian inkjet ink. For example, the bigger the particle size, the less viscous the non-Newtonian inkjet ink tends to be. In one example, the particle size can be from 5 nm to 50 nm. In another aspect, the particle size can be from 10 nm to 25 nm.

Metal oxide particles, e.g. $Fe_3O_4$, can be dispersed with dispersants. Examples of suitable dispersants include, but are not limited to, water-soluble anionic species of low and high molecular weight such as phosphates and polyphosphates, phosphonates and polyphosphonates, phosphinates and polyphosphinates, carboxylates (such as citric acid or oleic acid), polycarboxylates (such as acrylates and methacrylates). Other examples include hydrolysable alkoxysilanes with alkoxy group attached to water-soluble (hydrophilic) moieties such as water-soluble polyether oligomer chains, phosphate group or carboxylic group. In some examples, the dispersant used to disperse metal oxide particles can be a polyether alkoxysilane or polyether phosphate dispersant.

Examples of polyether alkoxysilane dispersants used to dispersed metal oxide particles can be represented by the following general Formula (I):

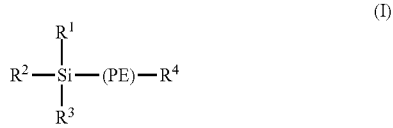

wherein:
a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —$OCH_3$ and —$OCH_2CH_3$. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.
b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—$CH(CH_3)$—O—), or a mixture of both types. In some examples, the polyether chain segment (PE) contains PEG units (—$CH_2CH_2$—O—); and
c) $R^4$ is hydrogen, or a linear or a branched alkyl group. In some examples, $R^4$ is an alkyl group having from 1 to 5 carbon atoms.

Other examples of dispersants used to disperse metal oxide particles can include polyether alkoxysilane dispersants having the following general Formula (II):

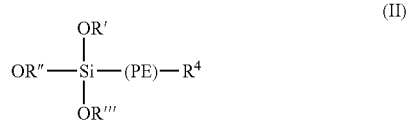

wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the metal oxide particles present in the ink composition are dispersed with polyether alkoxysilanes. Examples of suitable polyether alkoxysilanes include $(CH_3O)_3Si—(CH_2CH_2O)_{n'}$, H; $(CH_3CH_2O)_3Si—(CH_2CH_2O)_{n'}$, H; $(CH_3O)_3Si—(CH_2CH_2O)_{n'}$, $CH_3$; $(CH_3CH_2O)_3Si—(CH_2CH_2O)_{n'}$, $CH_3$; $(CH_3O)_3Si—(CH_2CH_2O)_{n'}$, $CH_2CH_3$; $(CH_3CH_2O)_3Si—(CH_2CH_2O)_{n'}$, $CH_2CH_3$; $(CH_3O)_3Si—(CH_2CH(CH_3)O)_{n'}$, H; $(CH_3CH_2O)_3Si—(CH_2CH(CH_3)O)_{n'}$, H; $(CH_3O)_3Si—(CH_2CH(CH_3)O)_{n'}$, $CH_3$; $(CH_3CH_2O)_3Si—(CH_2CH(CH_3)O)_{n'}$, $CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, Silquest®A-1230 manufactured by Momentive Performance Materials and Dynasylan® 4144 manufactured by Evonik/Degussa.

The amount of dispersant used in the metal oxide dispersion may vary from about 1% by weight to about 300% by weight of the metal oxide particles content. In some examples, the dispersant content range is between about 2 to about 150% by weight of the metal oxide particles content. In some other examples, the dispersant content range is between about 5 to about 100% by weight of the metal oxide particles content. The dispersion of metal oxide particles can be prepared via milling or dispersing metal oxide powder in water in the presence of suitable dispersants.

The metal oxide dispersion may be prepared by milling commercially available inorganic oxide pigment having large particle size (in the micron range) in the presence of the dispersants described above until the desired particle size is achieved. The starting dispersion to be milled can be an aqueous dispersion with solid content up to 40% by weight of the metal oxide pigment. The milling equipment that can be used is a bead mill, which is a wet grinding machine capable of using very fine beads having diameters of less than 1.0 mm (and, generally, less than 0.3 mm) as the grinding medium, for example, Ultra-Apex Bead Mills from Kotobuki Industries Co. Ltd. The milling duration, rotor speed, and/or temperature may be adjusted to achieve the dispersion particle size desired.

Generally, the structured network comprises a salt, typically a dissolved salt. This is the case regardless of whether the low molecular weight organic gelator is used, or the metal oxide gelator is used or both. In one example, the salt can be an organic salt. In one aspect, the salt can include salts of carboxylic acids (e.g. sodium or potassium 2-pyrrolidinone-5-carboxylic acid), sodium or potassium acetate, salts of citric acid or any organic acid including aromatic salts, and mixtures thereof. In another example, the salt can be an inorganic salt. In one aspect, the salt can be a monovalent salt. Such monovalent salts can include sodium, lithium, potassium cations and nitrate, chloride, acetate anions, and mixtures thereof. In another aspect, the salt can be multivalent, e.g. divalent, and can include calcium nitrate, magnesium nitrate, and mixtures thereof.

As discussed herein, the salt can generally be present in at least one of the inks of the binary ink set, e.g., in the gelator ink but also in some examples in the colorant ink, in an amount ranging from 0.05% to 40% by weight based on the total weight of ink. In one example, the salt can be present in an amount of 1% to 20% by weight and in some aspects, 0.5% to 4%, 0.5% to 3%, or 1% to 2%, by weight; based on the total weight of the ink. Further, while the salts can be present in either ink of the binary ink set, e.g., in the gelator ink or the colorant ink, such salts can also be present in both inks (the same salt or different salt).

The inclusion of a salt, particularly a dissolved salt in gelator ink, can contribute to the structure of the ink. In the case of metal oxide gelators, a salt can act to shield the electrostatic repulsion between particles and permit the van der Waals interactions to increase, thereby forming a stronger attractive potential resulting in a structured network and providing elastic content to a predominantly fluidic system.

As mentioned, these structured systems show non-Newtonian flow behavior, and providing useful characteristics for implementation in an ink-jet ink because their ability to shear or thermal thin for jetting. Once jetted, this feature allows the jetted drops to become more elastic-, mass-, or gel-like when they strike the media surface. These characteristics can also provide improved media attributes such as colorant holdout on the surface.

Regarding the inks of the present disclosure (with or without colorant), the role of salt can impact both the jettability and the response after jetting. When comparing two gelator inkjet inks (with or without salt, but otherwise identical), the ink with salt will typically have a lower viscosity over a range of shear rates. In one example, the salt can be added such that its presence in this system is just enough to make an appreciable difference in the printing characteristics of the ink, but not so much that the ink becomes too low in viscosity. This amount can be determined by routine experimentation. For example, the salted gelator ink can be designed so that the ink can refill quickly and produce a higher quality print. Higher quality printing can be determined in one aspect by improved optical density (when a colorant is present in the ink). Typically, inks with salt can have higher optical densities, while retaining good jettability properties and other properties, such as ink structure, rheological behavior, shear thinning, and jetting of ink drops. Furthermore, salt can also contribute to the gelator inks of the present disclosure having decreased restructuring time after shear or thermal thinning for printing. Higher pre-shear rates can often result in a likewise faster response in the presence of salt. In these instances, a fast restructuring of the ink can mean more solid-like behavior on the media surface in less time with less fluid penetration, and thus better colorant holdout and greater ink efficiency.

The properties of the structured network, e.g., viscosity, gel strength, conductivity, particle size, etc. and the page attributes, e.g. optical density, ink efficiency, media independence, etc., can be affected by a number of variables including the type of gelator, the type of salt, the type of solvents, the amounts of these components, pH, ionic strength, etc. Regarding viscosity, as discussed herein, the viscosity for non-Newtonian fluids are not discrete but change based on the physical energy applied to the fluid. As used herein, "viscosity" refers to dynamic viscosity unless otherwise stated. For the present inks, the viscosity can generally be measured at two states: proximate in time to an at rest state; i.e., with a minimum shear applied to the ink (shear rate as low as 5 s$^{-1}$), and proximate in time to a processing state; i.e., with a significant shear applied to the ink (shear rate of 10,000 s$^{-1}$). In one example, the present ink blends can have a dynamic viscosity ranging from 100 cps to 10,000 cps at rest and a dynamic viscosity ranging from 1 cps to 25 cps at a processing state. In one example, the dynamic viscosity can be 100 cps to 1,000 cps at a rest state and can be 1 cps to 15 cps at a processing state.

Additionally, the gelator and the salt can be present in the ink at a ratio that allows for formation of the structured network. In one example, the low molecular weight organic gelator and the salt can be present at a low molecular weight organic gelator to salt ratio ranging from 1:1 to 1:5 by weight. In one aspect, the ratio can be from 0.5:1 to 2:1. In another example, the gelator and the salt can be present at a gelator to salt ratio ranging from 0.5:1 to 5:1 by weight. In one aspect, the ratio can be from 2:1 to 3:1.

Generally, the present structured network is formed in an organic solvent. As used herein, "organic solvent" refers to any organic solvent or mixture thereof. As such, the term organic solvent includes systems of solvents. The present organic solvents are in addition to any water present in the non-Newtonian inkjet ink. Typical organic solvents that can be used include methanol, ethanol, propanol, iso-propanol, a glycol ether having at least about four carbon atoms, C4-8 alcohols, 1-methoxy-2-propanol, 2-methoxy ethanol, 2-ethoxy ethanol, 1-methoxy-2-acetoxy propane, ethyl lactate, a glycol ether (optionally having at least about 10 carbon atoms), a dihydric alcohol (optionally having at least about 2 carbon atoms), tripropylene glycol monomethyl ether, tripropylene glycol-n-butyl ether, propylene glycol phenyl ether, 2-pyrrolidinone (2P), 1-(2-hydroxyethyl)-2-pyrrolidinone (2HE2P), glycerol polyoxyethyl ether (LEG-1), 1,3-Bis(2-Hydroxyethyl)-5, 5-Dimethylhydantoin (Dantocol® DHE), 2-methyl-1,3-propanediol (MPdiol), ethylhydroxy-propanediol (EHPD), glycerol, 1,5-pentanediol, 1,2-pentanediol, thiodiglycol, sulfolane, 1,3-dimethyl-2-imidazolidinone, caprolactam, ethylene glycol, diethylene glycol, triethylene glycol, tetraethylene glycol, propylene glycol, dipropylene glycol, tripropylene glycol, trimethylene glycol, butylene glycol, hexylene glycol, polyethylene glycol, polypropylene glycol, glycerol, 1,2,6-hexanetriol, ethylene glycol monomethyl ether, ethylene glycol monoethyl ether, diethylene glycol monomethyl ether, diethylene glycol monoethyl ether, diethylene glycol dimethyl ether, and mixtures thereof.

Additionally, organic solvents can be classified as network participating solvents and network non-participating solvents. As used herein, "network participating solvent" refers to organic solvents that increase viscosity of the non-Newtonian inkjet ink, typically measured at any temperature functional. As used herein, "network non-participating solvent" refers to organic solvents that decrease the viscosity of the non-Newtonian inkjet ink, measured at any functional temperature. As such, the present non-Newtonian inkjet inks can be altered based on the types of organic solvents used. For example, when the non-Newtonian inkjet ink comprises a network participating solvent, the structured network can be strengthened, e.g., the viscosity of the non-Newtonian inkjet ink can be increased. However, when a network non-participating solvent is used, the structured network can be weakened, e.g., the viscosity of the non-Newtonian inkjet ink can be decreased. In one example, network participating solvents can include ethylhydroxy-propanediol (EHPD), glycerol, 1,5 pentanediol, ethylene glycol, triethylene glycol, and mixtures thereof. In another example, network non-participating solvents can include 2-pyrrolidinone, 1,2 pentanediol, MPDIOL, 1,2 hexanediol, and mixtures thereof. As such, the structured network properties, and resultant non-Newtonian inkjet ink properties, can be modified by mixing and matching particular organic solvents. In one example, the organic solvent comprises a mixture of a network participating solvent and a network non-participating solvent. Additionally, the present inks can contain a significant amount of organic solvent, including network participating solvents and/or network non-participating solvents. In one example, the organic solvent can be present in an amount ranging from 5% to 50% by weight based on the total weight of the non-Newtonian inkjet ink. In one aspect, the organic solvent can be present in an amount ranging from 10% to 40%, or even, 15% to 30% by weight.

As discussed herein, the present binary ink sets can produce a non-Newtonian inkjet ink having excellent optical density independent on the media used. In one example, the optical density of the non-Newtonian inkjet ink formed by the binary ink set can be increased by at least 5% over a comparative inkjet ink printed from the same inkjet printer on the same recording media with the same print coverage. In other aspects, the optical density can be increased by 10%, 15%, 20%, or 30%. Such recording media can include both coated and uncoated recording media. As used herein, "comparative inkjet ink" refers to an aqueous Newtonian inkjet ink such as HP DJ970 Black ink cartridge, which is commercially available.

As discussed herein, the present inks can include a colorant. Such colorants can include pigments and/or dyes. In one example, the colorant is a pigment, and in one aspect, a dispersed pigment. In another example, the colorant can be a dye. In yet another example, the colorant can be a mixture of a pigment and a dye. Regarding pigments, they can be self-dispersed or can further include dispersants, e.g., a polymer dispersant, small molecule dispersant, etc.

The present inks can be used in conjunction with multiple imaging systems, non-limiting examples of which include thermal or piezo inkjet, dye-sub, thermal transfer, electrostatic, liquid electrophotographic printing (LEP), etc. Additionally, the present inks can include water, and can further include non-ionic, cationic, and/or anionic surfactants, ranging from 0.001% to 10% by weight. The present formulations can include other components, such as biocides, viscosity modifiers, materials for pH adjustment, sequestering agents, preservatives, and the like.

In addition to the non-Newtonian inkjet inks described herein, the present disclosure provides for methods relating thereto. Turning now to FIG. 1, a method of printing a binary ink set to form a non-Newtonian inkjet image can comprise inkjet printing 110 a gelator inkjet ink and inkjet printing 120 a colorant inkjet ink, where the gelator inkjet ink and the colorant inkjet ink mix and form a non-Newtonian inkjet ink having a structured network. The gelator ink can comprise a gelator in an amount ranging from 0.1% to 10% by weight based on the total weight of the gelator ink. The colorant ink can comprise a colorant and an organic solvent. Generally, the gelator, the salt, and the organic solvent are present in amounts sufficient to form a structured network. Additionally, the non-Newtonian inkjet ink can have a first dynamic viscosity ranging from 25 cps to 10,000 cps at a first state and a second dynamic viscosity ranging from 1 cps to 50 cps at a second state and provide a dynamic viscosity ranging from 25 cps to 10,000 cps at a temperature of 23° C. and a dynamic viscosity ranging from 1 cps to 50 cps at a temperature of 50° C.

As discussed herein, the present binary ink set can be configured to trigger a reaction that forms a structured network when mixed. In one example, the triggering mechanism can be the pH of the inks. In another aspect, the gelator inkjet ink can have a first pH and the colorant inkjet ink has a second pH, and wherein, upon printing, the non-Newtonian inkjet ink has a third pH that allows the structured network to form within (minutes or even seconds, e.g., less than 30 seconds, less than 20 seconds, less than 10 seconds, less than 5 seconds, etc.). In another aspect, the first pH ranges from 2 to 7, the second pH ranges from 7 to 12, and the third pH ranges from 7 to 10. As an example, as mentioned, a metal oxide may reside as a fluid at about pH 5 or 6 and a low molecular weight organic gelator as a fluid at about pH 9 or 10. Each fluid thus is dependent on the other to maximize the structure formation of interest.

Regarding the present method steps, such steps can be performed in a number of sequences and are not intended to be limited to the order written. For example, the printing the gelator ink can be performed before printing the colorant ink, and vice versa. Additionally, it is noted that any and all combinations of such steps or individual step may be performed sequentially or simultaneously. For example, printing the gelator ink and printing the colorant ink may be performed sequentially or may be performed simultaneously.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EXAMPLES

The following examples illustrate some embodiments of the present inks and methods that are presently known. However, it is to be understood that the following are only exemplary or illustrative of the application of the principles of the present inks and methods. Numerous modifications and alternative examples may be devised by those skilled in the art without departing from the spirit and scope of the present compositions and methods. The appended claims are intended to cover such modifications and arrangements. Thus, while the present inks and methods have been described above with particularity, the following examples provide further detail in connection with what are presently deemed to be acceptable embodiments.

Example 1—Binary Ink Set

A non-Newtonian inkjet ink was prepared to be tested against commercially available HP DJ970 Cartridge Ink (Black pigment-containing Newtonian Inkjet Ink; viscosity 2-3 cps at 667 $s^{-1}$, 5333 $s^{-1}$, and 10,677 $s^{-1}$). The non-Newtonian inkjet ink had the following formulation, as set forth in Table 1:

TABLE 1

| Components | Non-Newtonian Gelator Inkjet Ink |
|---|---|
| Alumina dispersion (20 nm**) | 5 wt % |
| 1,2 Pentanediol | 12 wt |
| Water | Balance |
| PH | 6 |
| Viscosity at 667 $s^{-1}$ | 16.2 cps |
| Viscosity at 5,333 $s^{-1}$ | 6.5 cps |
| Viscosity at 10,667 $s^{-1}$ | 5.6 cps |

**Dispersed at pH 4.5 (wt % based on alumina solids content in ink)

Example 2—Optical Density and Media Independence

Figure 2:
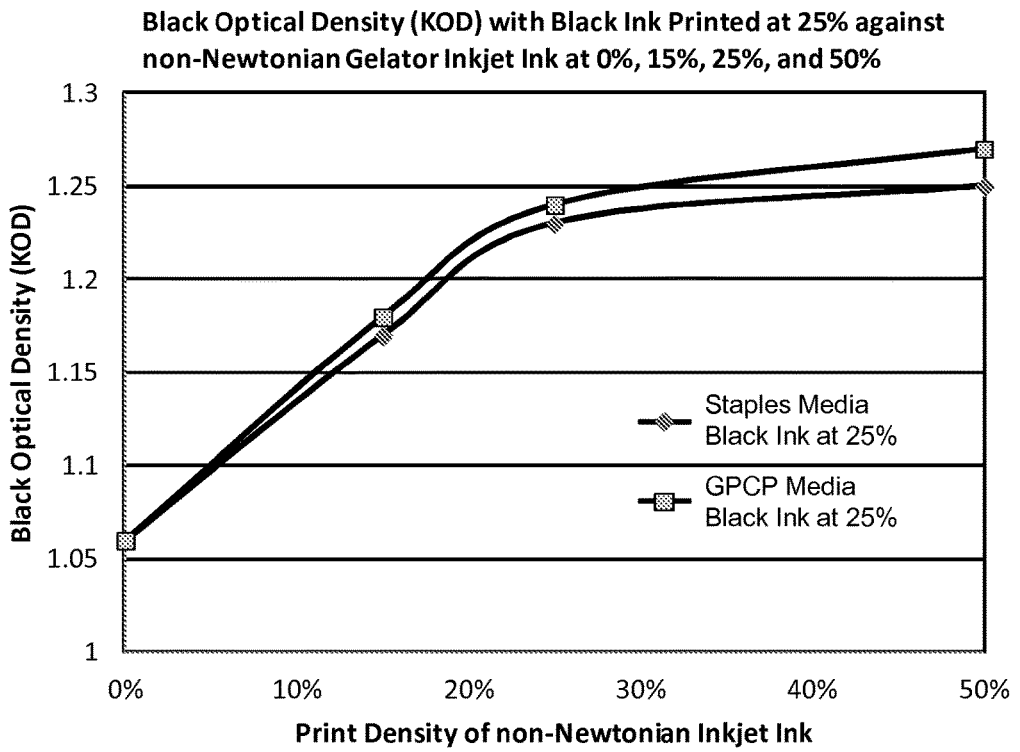
FIG. 2 is a graph depicting black optical density (KOD) with a black inkjet ink printed at 25% print density against a non-Newtonian gelator inkjet ink at various print densities.
Figure 3:
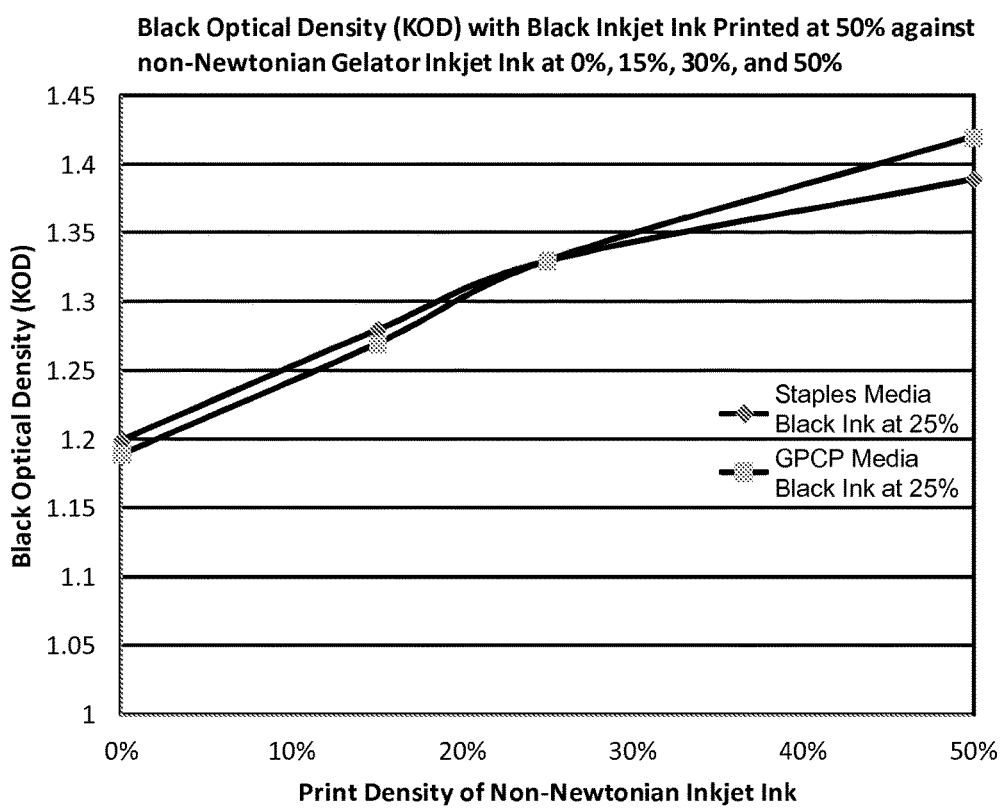
FIG. 3 is a graph depicting black optical density (KOD) with a black inkjet ink printed at 50% print density against a non-Newtonian gelator inkjet ink at various print densities.

The binary ink set of Example 1 (non-Newtonian Gelator Inkjet Ink and DJ970 Black Inkjet Ink) was printed on a Hewlett Packard test bed at various print densities to give various ratios of Non-Newtonian Gelator Inkjet Ink to Black. Various media papers were also used, and the black optical density (KOD) for each sample was determined using a Greytag Spectrolino Spectrometer. Both inks were filled into the same printhead in two chambers and printed at the print densities described in Table 2. In addition to the various blend ratios, in one example, the non-Newtonian Inkjet Ink was printed at 0% print density, providing a baseline control for the Black Inkjet Ink printed alone. The results are listed in Table 2 and in FIGS. 2 and 3, as follows:

TABLE 2

|  | Non-Newtonian Gelator Inkjet Ink (Print Density): | | | |
| --- | --- | --- | --- | --- |
|  | 0% | 15% | 25% | 50% |
| Staples Media Black Inkjet Ink printed at 25% | 1.06 KOD | 1.17 KOD | 1.23 KOD | 1.25 KOD |
| Staples Media Black Inkjet Ink printed at 50% | 1.2 KOD | 1.28 KOD | 1.33 KOD | 1.39 KOD |
| GPCP Media Black Inkjet Ink printed at 25% | 1.06 KOD | 1.18 KOD | 1.24 KOD | 1.27 KOD |
| GPCP Media Black Inkjet Ink printed at 50% | 1.19 KOD | 1.27 KOD | 1.33 KOD | 1.42 KOD |

STAPLES—Staples Copy Paper (Made for Staples)
GPCP—GEORGIA PACIFIC COPY PAPER (Georgia Pacific)

As shown in Table 2, the binary ink set had increasingly higher KOD (black optical density) as compared to the control ink (non-Newtonian Inkjet Ink not printed (0%)), and as the amount of the non-Newtonian Inkjet Ink was increased, continued improvement in KOD was achieved.

The effect observed was possible despite the fact that a solvent was used to lower the viscosity of the fluid formulation. Furthermore, the KOD values listed in Table 2 indicate that even when the Black Inkjet Ink is diluted with the gelator ink, the optical density still increased. In essence, at a print density of 50% non-Newtonian Inkjet Ink combined with 50% of a Black Inkjet Ink, this combination effectively provides a dilution of the total colorant content. Thus, the optical densities are actually unexpectedly better, even when diluted with the colorless Gelator Inkjet Ink.

Example 3—Binary Ink Set

A second binary ink set was prepared as show in Table 3, as follow:

TABLE 3

| Components | Non-Newtonian Gelator Inkjet Ink (Metal Oxide Gelator) | Pigmented Non-Newtonian Gelator Inkjet Ink (Low Molecular Weight Organic Gelator) |
| --- | --- | --- |
| Alumina dispersion (20 nm**) | 5 wt % | — |
| 1,2 Pentanediol | 12 wt % | — |
| 2-pyrrolidinone 5-carboxylic acid | — | 2 wt % |
| 2-pyrrolidinone | — | 10 wt % |
| EHPD | — | 10 wt % |
| FMOC-PHE* | — | 1 wt % |
| Carbon Black | — | 3 wt % |
| Water | Balance | Balance |

*FMOC-PHE is N-(9-fluorenylmethoxycarbonyl)-L-phenylalanine
**Dispersed aluminum oxide pH 4.5 (wt % based on alumina solids content in ink)

The ink set of Table 3 comprises the Gelator Inkjet Ink of Example 1 (Metal Oxide Gelator type) and a colorant inkjet ink which is also a non-Newtonian Gelator Inkjet Ink (Low Molecular Weight Organic Gelator type). In this system, optical density can also be improved similarly as shown above in Example 2. However, in this example, the interaction between the inks can also be controlled by a combination of salt and pH interactions with the FMOC moiety. This is an example of two non-Newtonian inks printed in a binary setup to give overall improvement and media independence in print quality.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A binary ink set, comprising:
a non-Newtonian gelator inkjet ink including an organic solvent and a gelator in an amount ranging from 0.1% to 20% by weight based on the total weight of the gelator ink; and
a colorant inkjet ink comprising a colorant and an organic solvent;
wherein the gelator inkjet ink and the colorant inkjet ink are formulated to form a structured network when contacted, wherein the gelator inkjet ink does not self-assemble into a structured network until mixing with the colorant inkjet ink, and wherein the gelator inkjet ink has a first dynamic viscosity ranging from 25 cps to 10,000 cps when subject to a shear rate of 5 s$^{-1}$ and a second dynamic viscosity ranging from 1 cps to 50 cps at a second state when subject to a shear rate of 10,000 s$^{-1}$, measured at 25° C.

2. The binary ink set of claim 1, wherein the gelator is a low molecular weight organic gelator.

3. The binary ink set of claim 1, wherein the gelator is a metal oxide.

4. The binary ink set of claim 1, wherein the first dynamic viscosity is 100 cps to 1000 cps and the second dynamic viscosity is 1 cps to 25 cps.

5. The binary ink set of claim 1, wherein
the gelator is a low molecular weight organic gelator selected from the group consisting of amino acids, peptides, cyclic peptides, amino acids having a protecting group, peptides having a protecting group, cyclic peptides having a protecting group, and mixtures thereof; or
the gelator is a metal oxide selected from the group consisting of aluminum oxide, silicon dioxide, zinc oxide, iron oxide, titanium dioxide, indium oxide, zirconium oxide.

6. The binary ink set of claim 1, wherein
the gelator inkjet ink further comprises a salt present in an amount from 0.05% to 40% by weight based on the total weight of the gelator inkjet ink, or
the colorant inkjet ink further comprises a salt present in an amount from 0.05% to 40% by weight based on the total weight of the colorant inkjet ink; and wherein the salt and the gelator form the structured network.

7. The binary ink set of claim 6, wherein the gelator is a low molecular weight organic gelator present in an amount ranging from 1% to 5% by weight based on the total weight of the gelator inkjet ink and the salt is present in an amount ranging from 1% to 10% by weight based on the total weight of the gelator or colorant inkjet ink, or wherein the gelator is a metal oxide present in an amount ranging from 1% to 5% by weight based on the total weight of the gelator inkjet ink and the salt is present in an amount ranging from 0.5% to 4% by weight based on the total weight of gelator or colorant inkjet ink.

8. The binary ink set of claim 6, wherein the gelator is a low molecular weight organic gelator and the low molecular weight organic gelator and the salt are present at a low molecular weight organic gelator to salt ratio ranging from 1:1 to 1:5 by weight; or wherein the gelator is a metal oxide and the metal oxide and the salt are present at a metal oxide to salt ratio ranging from 0.5:1 to 5:1 by weight.

9. The binary ink set of claim 1, wherein the structured network is free of polymers.

10. The binary ink set of claim 1, wherein the organic solvent of the gelator inkjet ink and the organic solvent of the colorant inkjet ink is a network participating solvent independently selected from the group consisting of ethyl-hydroxy-propanediol (EHPD), glycerol, 1,5 pentanediol, ethylene glycol, tritethylene glycol, and mixtures thereof; or the organic solvent is a network non-participating solvent selected from the group consisting of 2-pyrrolidinone, 1,2 pentanediol, 2-methyl-1,3-propanediol (MPDIOL), 1,2 hexanediol, and mixtures thereof.

11. The binary ink set of claim 1, wherein one or both of the non-Newtonian gelator inkjet ink or the colorant inkjet ink includes a network participating solvent.

12. The binary ink set of claim 1, wherein the gelator inkjet ink has a first pH ranging from 2 to less than 7 and the colorant inkjet ink has a second pH ranging from greater than 7 to 12, and wherein, upon printing, a resultant non-Newtonian inkjet ink has a third pH ranging from 7 to 10 that allows the structured network to form within 2 minutes.

13. The binary ink set of claim 1, wherein the colorant inkjet ink is a Newtonian inkjet ink.

14. The binary ink set of claim 1, wherein the colorant inkjet ink is a non-Newtonian inkjet gelator ink.

15. A method of printing a binary ink set to form a non-Newtonian inkjet image, comprising:
inkjet printing a gelator inkjet ink, comprising an organic solvent and a gelator in an amount ranging from 0.1% to 20% by weight based on the total weight of the gelator ink; and
inkjet printing a colorant inkjet ink in contact with the gelator inkjet ink, the colorant inkjet ink, comprising an organic solvent and a colorant,
wherein the gelator inkjet ink and the colorant inkjet ink, upon printing, mix and form a non-Newtonian inkjet image having a structured network, wherein the gelator inkjet ink does not self-assemble into a structured network until mixing with the colorant inkjet ink.

16. The binary ink set of claim 1, wherein the gelator inkjet ink is devoid of colorant.

* * * * *

UNITED STATES PATENT AND TRADEMARK OFFICE
CERTIFICATE OF CORRECTION

PATENT NO. : 9,822,270 B2
APPLICATION NO. : 15/118403
DATED : November 21, 2017
INVENTOR(S) : Adamic et al.

Page 1 of 1

It is certified that error appears in the above-identified patent and that said Letters Patent is hereby corrected as shown below:

In the Claims

In Column 12, Line 48, in Claim 1, delete "50 cps at a second state when" and insert -- 50 cps when --, therefor.

In Column 14, Line 12, in Claim 12, delete "10that" and insert -- 10 that --, therefor.

Signed and Sealed this
Twenty-fourth Day of April, 2018

Andrei Iancu
*Director of the United States Patent and Trademark Office*